March 18, 1924.

Re. 15,794

W. H. CARY

SHOE

Original Filed June 29, 1923

INVENTOR:

William H. Cary,
by Dodge and Sons,
Attys.

Reissued Mar. 18, 1924. Re. 15,794

UNITED STATES PATENT OFFICE.

WILLIAM H. CARY, OF BROCKTON, MASSACHUSETTS, ASSIGNOR TO AVON SOLE COMPANY, OF AVON, MASSACHUSETTS, A CORPORATION OF MASSACHUSETTS.

SHOE.

Original No. 1,475,747, dated November 27, 1923, Serial No. 648,459, filed June 29, 1923. Application for reissue filed January 31, 1924. Serial No. 689,770.

*To all whom it may concern:*

Be it known that I, WILLIAM H. CARY, a citizen of the United States, and resident of Brockton, county of Plymouth, State of Massachusetts, have invented an Improvement in Shoes, of which the following description, in connection with the accompanying drawing, is a specification, like characters on the drawing representing like parts.

This invention relates to improvements in shoes and shoe soles and also in the process of forming the sole and attaching the sole to the shoe. The general object thereof is to provide a shoe having a crude rubber sole which will be securely attached to the bottom of the shoe.

Heretofore certain shoes of this type have been made with the crude rubber sole sewed directly to the welt of the shoe but this has proved to be unsatisfactory because as the sole was soft the stitches which held the sole on the shoe would pull through the tread and permit it easily to break away from the shoe. Also the soft plastic sole permitted the welt of the shoe to spread and the alternate spreading and contracting as the wearer walked was uncomfortable.

In other shoes of this type, a leather base sole was provided which covered the bottom of the shoe and the stitches went through the crude rubber tread member of the sole and through the leather base member and then through the welt of the shoe to hold the sole on the bottom of the shoe. In order to assist in retaining the tread member on the leather base member a cement was used on the adjoining surfaces of the leather base member and the tread member but, because of the different natures and compositions of the tread member and the base member, the union was not satisfactory. If a cement was used which would stick to the crude rubber tread member it would not adhere to the leather base member and if a cement was used which would stick to the leather base member it would not stick sufficiently to the tread member to keep the tread member from breaking away from the leather base member. The stitches, as above-mentioned, would hold the tread member to the leather base member for a short period of time but would finally pull through the tread member and permit it to part from the leather base member. When the tread member parts from the leather base member even a slight distance at a single point, water is permitted to enter between the base member and the tread member, and this opening allows the rubber to work and the stitches to cut through. The edge of the leather base member is usually glazed to prevent water from entering the interior of a leather base member from the edge, but the flat surface of the leather base member is usually unglazed and if water is permitted to get into the sole of the shoe next to the leather base member between said member and the tread, the dampness gradually spreads until the whole leather base sole is more or less damp depending upon the amount of water which gets in. The water causes the cement which sticks the tread member to the leather base member to deteriorate and thus shortens the time that the tread member will be held on the leather base member by the adhesion of the cement. Further than this, the leather base member is usually made from split leather, and is of such loose texture that even though the cement which is used to stick the tread member to the base member firmly joins the two members, the layer of leather which is permeated by the cement easily pulls away from the remainder of the leather base member and allows the tread member to part from the shoe.

One of the objects of the present invention is to overcome the difficulties which are present in the usual type of shoe above described.

Another object of the invention is to provide a shoe with a novel unitary sole.

Another object of the invention is to provide a novel process for producing a shoe having a unitary waterproof sole in which the stitches which secure the outer sole to the welt are embedded in the homogeneous material of the outer sole.

Other objects and features of the invention will more fully appear from the following description and the accompanying drawing and will be particularly pointed out in the claims.

The drawings illustrate in elevation a preferred form of shoe and shoe sole embodying the broad principles of the invention.

In the drawings:—

Figure 1:
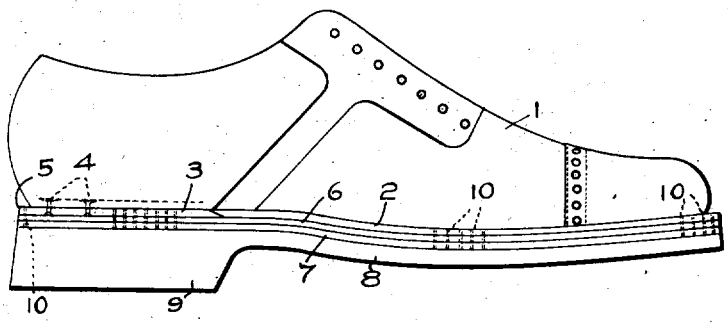
Fig. 1 is a shoe with a preferred type of sole applied thereto.
Figure 2:
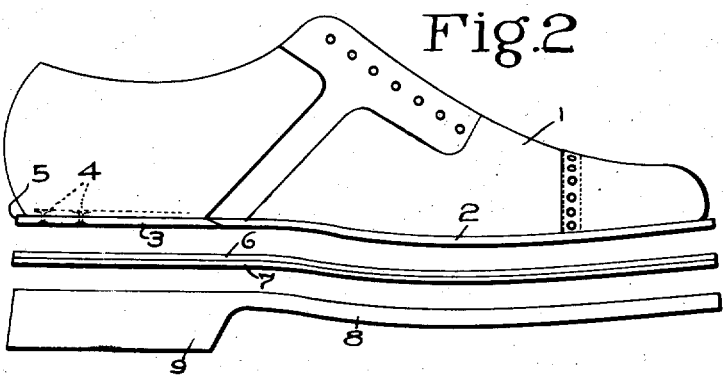
Fig. 2 is an elevation of a shoe and sole therefor showing the sole in separated layers as they are fixed to the shoe.

In the preferred embodiment of the invention illustrated herein the shoe comprises an upper 1 and a welt 2 fastened to the upper and inner sole in the usual manner. A heel seat 3 is fastened, preferably by nails 4, to the heel of the shoe in order to provide a projecting flange 5 around the heel as a continuation of the welt to which the sole of the shoe may be sewn. The outer sole of the shoe comprises a base member 6 for joining to the welt of the shoe, an intermediate member 7, and a relatively thick tread member 8 having a heel 9 preferably formed integral therewith. The tread member is preferably of crude rubber and the intermediate member is of the same material. The base member is of a vulcanized rubber and fibre composition having such characteristics that it may be caused to cohere homogeneously with the material of the intermediate member by the use of a cementitious composition containing a solvent for the rubber of the base and intermediate members. The fibre in the base member gives or assists in giving the base member the desirable property of being non-extensible so that it holds the welt and sole of the shoe together and the bottom of the shoe in shape, and the rubber constituent of the base member causes said member to cohere strongly with the material of the intermediate member. The base member and intermediate member are made as a base unit which may be readily sewn to the welt of the shoe. The tread member may then be caused to cohere firmly to the intermediate member after the base unit has been sewn to the shoe and on the outside of the stitching. The stitches are thus embedded in the homogeneous composition of the outer sole well beneath the surface thereof and are protected from the deteriorating effect of any moisture or dampness.

In making the sole and securing it to the shoe a quantity of crude rubber is first moulded to form the tread member 8 and the intermediate member 7 of such an area that they will well cover the bottom of the shoe and form a sole therefor. The base member is moulded in the proper shape from a composition of rubber and fibre and is then vulcanized. The adjoining surfaces of the base member and the intermediate member are then coated with a rubber cement having a constituent which is a solvent for the rubber of both members and when the cement has dried to such an extent that the surfaces are in the right condition for joining they are placed together and the base unit is then placed in a press preferably heated. When pressure is applied, the intermediate member is cemented to the base member to form a base unit, the layers of which are inseparable. A base unit is thus formed comprising an upper layer of waterproof vulcanized rubber and fibre material with a facing or lower layer of crude rubber cohering homogeneously to the upper layer. The base unit is then sewed by means of stitches 10 to the welt of the shoe with the fibrous material lying next to the welt and the facing outermost. The outer surface of the intermediate member and the inner surface of the tread member are then coated with rubber cement containing a constituent which is a solvent of the rubber and stuck together by means of pressure, with or without the application of heat, which causes a firm cohesion of the tread and intermediate members which inseparably holds them together just as the intermediate member is inseparably held to the base member.

By carrying out the above process with the materials formed and in the condition above stated I am enabled to provide a welted shoe comprising an outer sole having a base unit consisting of an upper layer of waterproof vulcanized rubber and fibre material and of a lower layer of crude rubber cohering homogeneously to the upper layer throughout its entire area, which unit is stitched to the welt of the shoe, and having a relatively thick thread member of crude rubber cohering homogeneously to the lower layer of the base unit. The parts of the sole are inseparably joined and the stitching, which secures the sole to the welt of the shoe, is embedded in the composition of crude rubber well beneath the tread surface thereof thereby protecting the stitches from dampness.

I desire that the invention be construed as broadly as the limitations in the claims.

Having thus described the invention what is claimed as new and desired to be secured by Letters Patent is:

1. A welted shoe comprising a welt, a base unit consisting of an upper layer of a tough substantially non-extensible homogeneous composition of fibre and rubber to maintain the shape of the shoe and form an anchorage for stitches and a lower layer of crude rubber cohering homogeneously to the upper layer throughout its entire area, stitches passing through and uniting the welt and base unit and a relatively thick tread member of crude rubber cohering homogeneously to the lower layer of the base unit throughout its entire area, whereby the base unit and tread member form an indivisible outer sole with the stitches embedded well beneath the tread surface.

2. The process of making a shoe which consists in providing a welted shoe upper, providing a base unit of an upper layer of a tough substantially non-extensible homogeneous composition of fibre and rubber to maintain the shape of the shoe and provide an anchorage for stitches and a lower layer of crude rubber cohering homogeneously to the upper layer throughout its entire area, stitching the base unit to the welt with the upper layer contacting with the welt, applying a relatively thick tread member of crude rubber to the lower layer of the base unit and causing the rubber constituents of the tread member and base unit to cohere homogeneously throughout their entire contacting areas.

In testimony whereof, I have signed my name to this specification.

WILLIAM H. CARY.